(No Model.)
W. X. STEVENS.
FAUCET.
No. 483,795. Patented Oct. 4, 1892.
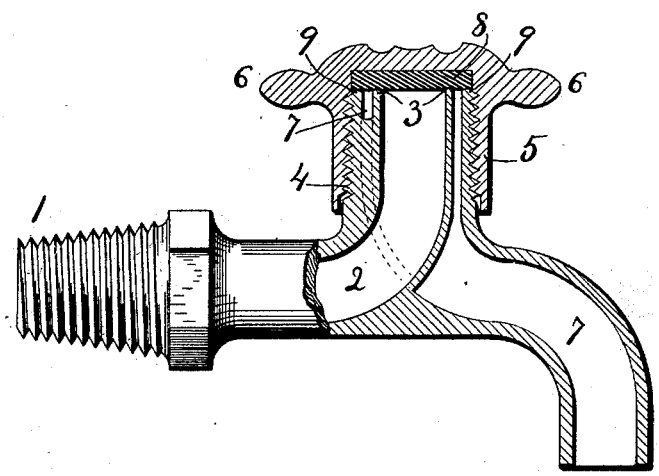
WITNESSES,
P. E. Stevens.
M. C. Hillyard.
INVENTOR
William X. Stevens.

UNITED STATES PATENT OFFICE.

WILLIAM X. STEVENS, OF WASHINGTON, DISTRICT OF COLUMBIA.

FAUCET.

SPECIFICATION forming part of Letters Patent No. 483,795, dated October 4, 1892.

Application filed May 12, 1892. Serial No. 432,777. (No model.)

*To all whom it may concern:*

Be it known that I, WILLIAM X. STEVENS, a citizen of the United States, residing at Washington, in the District of Columbia, have invented certain new and useful Improvements in Faucets; and I do hereby declare the following to be a full, clear, and exact description of the invention, such as will enable others skilled in the art to which it appertains to make and use the same.

This invention relates in general to stop-cocks and faucets which are used upon pipes to stop the flow of a fluid through the pipes or to permit the flow at the will of the operator, and more particularly to that class known as "compression cocks or faucets;" and the object of the invention is to prevent leakage through the working joint of the faucet, or in case it does leak after the faucet becomes worn by long service that such leakage shall be directed away from the handle of the faucet, so that the operator may not be burned in using hot water or steam, nor be spattered where the water service is under great pressure and at the same time to make a cock or faucet with the fewest possible number of parts and of simple construction in order that it may be perfectly reliable and as cheap as or cheaper than other faucets used for a similar purpose.

To this end my invention consists in the construction and combination of parts forming a faucet hereinafter described and claimed, reference being had to the accompanying drawing, which represents my faucet in longitudinal vertical section, partly in side elevation.

1 represents the end which is to be attached to the pipe, and it may be arranged with either an external screw-thread, as shown, to fit into a common pipe T or elbow or it may be internally screw-threaded to receive a pipe or nipple end.

2 represents the inlet-passage for water, steam, &c., provided with a true, smoothly-finished tubular end 3 to serve as a valve-seat. Around this tubular end the body of the faucet is cylindrical and externally screw-threaded at 4, and upon that screw an internally-threaded cap 5 is fitted to be screwed up and down from and to the tube end 3 to serve as a valve therefor, and any suitable handles 6 may be provided by means of which to turn the cap.

7 represents the outlet-passage partially surrounding the inlet-passage 2 and entirely surrounding the tube end 3 thereof, the passage being annular in this region.

8 represents the valve-packing carried by the cap to close the end of the tube 3, and at the same time it may rest upon the body end 9. This packing is a simple plane disk of any suitable material without any hole in it, and it requires no screw or other fastener to hold it in the cap. It is neatly fitted therein when dry, and in service it is always wet and swelled, so that it sticks closely in place; but if it were circumferentially loose it could never get out of place nor become leaky, because its surroundings and the water-pressure tend to keep it where it belongs. This faucet will never leak until the packing is worn out. In a better class of valves the packing is not necessary, because the cap may be so truly fitted to the seat on the tube end 3 as to be a valve therefor, especially if the two parts which come together are made conical in globe-valve style; but for the cheaper class of water cocks or faucets in general use a soft packing is preferable.

The valve fitting as a cap both upon the inlet-pipe and upon the surrounding body has many advantages, some of which are as follows:

First. The outer bearing prevents the edges of the leather or other soft packing from becoming warped by heat. Such warping causes leakage and displacement of the packing.

Second. This outer bearing prevents the cap from being screwed down upon the inner tube so hard as to force it out of a true position. Such forcing is frequently the ruin of a faucet.

Third. It forces the cap to come down true upon the valve-seat every time, so that valves thus shaped are more likely to wear true in service than to wear out of true.

Fourth. Should there be a flaw or groove across the edge of the valve-seat the leakage therefrom will be into the proper delivery outlet and cannot pass the outer joint.

That the packing is the inner face of the top of the cap or is the piece carried by the cap is essential to this invention, and any extra piece to hold the packing in the cap or to connect the cap with the body is not of this invention.

A plug-valve has a stem around which any leakage at the instant of working it is directed to the handle, and packing is required to prevent burning the operator with hot water by such leakage; but my cap-valve has the outlet of its working joint directed away from the handle, so that if it leaks at the time of working that leakage is delivered in the same direction as the general outlet and can do no harm.

In many turn-plug faucets there is a cap some like mine; but it is screwed on as a fixture of the body, is not movable in service, and is perforated at the top to receive the plug-stem. Such is not my invention, and as a distinguishing feature I describe mine as a closed cap—that is, not perforated through its top. Furthermore, a cap not screw-threaded, but made to rotate in a plane to open a valve, is not my invention. My cap is a valve which necessarily moves away from the valve-seat in the process of opening.

Besides the advantages of simplicity, reliability, cheapness, safety in service, and long wearing qualities my faucet has the further advantage of presenting its valve-seat directly at the end of the body when the cap is off, so that it may be fitted perfectly without special tools in being made, and if it ever becomes grooved by gritty water or out of true the seat may be trued up with a file without removing the faucet from the pipe.

By the words "at or near the end of a surrounding portion of the body" as used in the claims I mean that the valve-seat should be so near level with the end of the body that a disk-shaped packing of usual flexible material will fit upon both the seat and the end of the body at once and so near level that the seat may be made or repaired without special tools.

The packing is inexpensive, and it may be removed when worn and be replaced by any person without tools.

Having thus fully described my invention, what I believe to be new, and desire to secure by Letters Patent, is the following:

1. The combination, in a faucet, of a body portion externally screw-threaded and having an inlet-pipe within it provided with a valve-seated end flush with the end of the body and separated therefrom by an annular delivery-passage, a close-ended cap internally screw-threaded to fit upon the body, and a valve-packing carried by the said cap, substantially as described.

2. The combination, in a faucet, of a screw-threaded body portion provided with an internal valve-seat, the end of the body and the said valve-seat being nearly level with each other, and a cap-shaped valve adapted to fit upon both the seat and the end of the body at once, substantially as described.

In testimony whereof I affix my signature in presence of two witnesses.

WILLIAM X. STEVENS.

Witnesses:
ALBERT SPEIDEN,
M. C. HILLYARD.